United States Patent
Simske et al.

(10) Patent No.: US 8,818,018 B2
(45) Date of Patent: Aug. 26, 2014

(54) SYSTEM AND METHOD FOR ENHANCING SECURITY PRINTING

(75) Inventors: Steven J. Simske, Fort Collins, CO (US); Malgorzata M. Sturgill, Fort Collins, CO (US); Marie Vans, Haifa (IL); Paul S. Everest, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 347 days.

(21) Appl. No.: 13/145,321

(22) PCT Filed: Jan. 24, 2009

(86) PCT No.: PCT/US2009/031934
§ 371 (c)(1), (2), (4) Date: Jul. 19, 2011

(87) PCT Pub. No.: WO2010/085257
PCT Pub. Date: Jul. 29, 2010

(65) Prior Publication Data
US 2011/0280480 A1    Nov. 17, 2011

(51) Int. Cl.
*G06K 9/00* (2006.01)
*G06T 1/00* (2006.01)

(52) U.S. Cl.
CPC .......... *G06K 9/00442* (2013.01); *G06T 1/0028* (2013.01)
USPC .......................................... 382/100; 382/112

(58) Field of Classification Search
USPC .......................................... 382/100, 141–152
See application file for complete search history.

(56) References Cited

U.S. PATENT DOCUMENTS

| | | | | |
|---|---|---|---|---|
| 5,027,295 | A * | 6/1991 | Yotsuya | 382/147 |
| 5,995,638 | A * | 11/1999 | Amidror et al. | 382/100 |
| 6,782,144 | B2 | 8/2004 | Bellavita et al. | |
| 2003/0133595 | A1 | 7/2003 | Farmer | |
| 2005/0281452 | A1 * | 12/2005 | Usikov | 382/141 |
| 2006/0202470 | A1 | 9/2006 | Simske et al. | |
| 2006/0215233 | A1 * | 9/2006 | Hirai et al. | 358/448 |
| 2007/0024915 | A1 | 2/2007 | Simske et al. | |
| 2007/0183661 | A1 * | 8/2007 | El-Maleh et al. | 382/173 |
| 2007/0256136 | A1 | 11/2007 | Simske et al. | |

(Continued)

FOREIGN PATENT DOCUMENTS

| | | |
|---|---|---|
| CN | 1143413 | 2/1997 |
| CN | 1388945 | 1/2003 |

(Continued)

OTHER PUBLICATIONS

International Search Report and Written Opinon for Application No. PCT/US2009/031934 dated Sep. 1, 2009 (11 pages).

(Continued)

*Primary Examiner* — Alex Liew

(57) ABSTRACT

A system for enhancing security printing includes a segmentation system, a secure database in operative communication with the segmentation system, a secure registry in selective operative communication with the segmentation system, and an analysis system in operative communication with the segmentation system and the secure database, and in selective operative communication with the secure registry. The segmentation system performs zoning analysis on a scanned image to identifying a list of regions in the image. The secure database stores at least one of i) a template, or ii) prior zoning output specification. The secure registry stores region of interest information and information pertaining to strategies for identifying a region of interest. The analysis system identifies the region of interest utilizing at least one of the secure database or the secure registry.

17 Claims, 2 Drawing Sheets

(56) References Cited

U.S. PATENT DOCUMENTS

2008/0031542 A1* 2/2008 Lei .................................. 382/283
2008/0043273 A1   2/2008 Simske et al.
2008/0149725 A1   6/2008 Rosenbaum
2011/0116681 A1* 5/2011 Simske et al. ................ 382/100

FOREIGN PATENT DOCUMENTS

| CN | 1577392 | 2/2005 |
| CN | 101196979 | 6/2008 |
| EP | 1854047 | 11/2007 |
| KR | 20090002012 | 1/2009 |

OTHER PUBLICATIONS

Simske, "Low-Resolution Photo/Drawing Classification: Metrics, Method & Archiving Optimization," Image Processing, 2005, ICIP 2005, vol. 2, Sep. 11-14, 2005 pp. II-534-537.

* cited by examiner

SYSTEM AND METHOD FOR ENHANCING SECURITY PRINTING

BACKGROUND

The present disclosure relates generally to a system and a method for enhancing security printing.

Product labeling and security packaging are important components of brand protection, product tracking and authenticating, as well as of anti-counterfeiting initiatives. Such labels/packages must be authorized (i.e., access to them should be privileged), authenticable (e.g., containing encoded/encrypted information that can be decoded/decrypted for security purposes), and unique (i.e., differentiable from any other printed material). In an effort to create such labels/packages, a unique ID, in the form of, for example, a deterrent or mark may be added. Furthermore, measures are often taken to enhance the probability that the product cannot be counterfeited, for example, by making the packaging or labels difficult and/or time consuming to replicate and/or by using variable data printing (VDP).

BRIEF DESCRIPTION OF THE DRAWINGS

Features and advantages of embodiments of the present disclosure will become apparent by reference to the following detailed description and drawings, in which like reference numerals correspond to the same or similar, though perhaps not identical, components. For the sake of brevity, reference numerals having a previously described function may or may not be described in connection with subsequent drawings in which they appear.

DETAILED DESCRIPTION

Embodiments of the system and method disclosed herein enable areas of interest in a printed image to be identified using multiple regions which belong to a cluster or group of images. Such identification may be useful as a front-end application for prioritizing regions of interest for their use in subsequent applications. Furthermore, the region of interest identification system may be used to offer a variety of services, such as, for example, the following: the detection of the steganographic marks may be used by brand protection investigators to process many images simultaneously and discover counterfeit images in large data sets; the detection of variable data printing regions may be used for proofing and/or inspecting in print authentication; and the detection of low quality marks may be used for proofing, print defect detection, and auditing.

Figure 1:
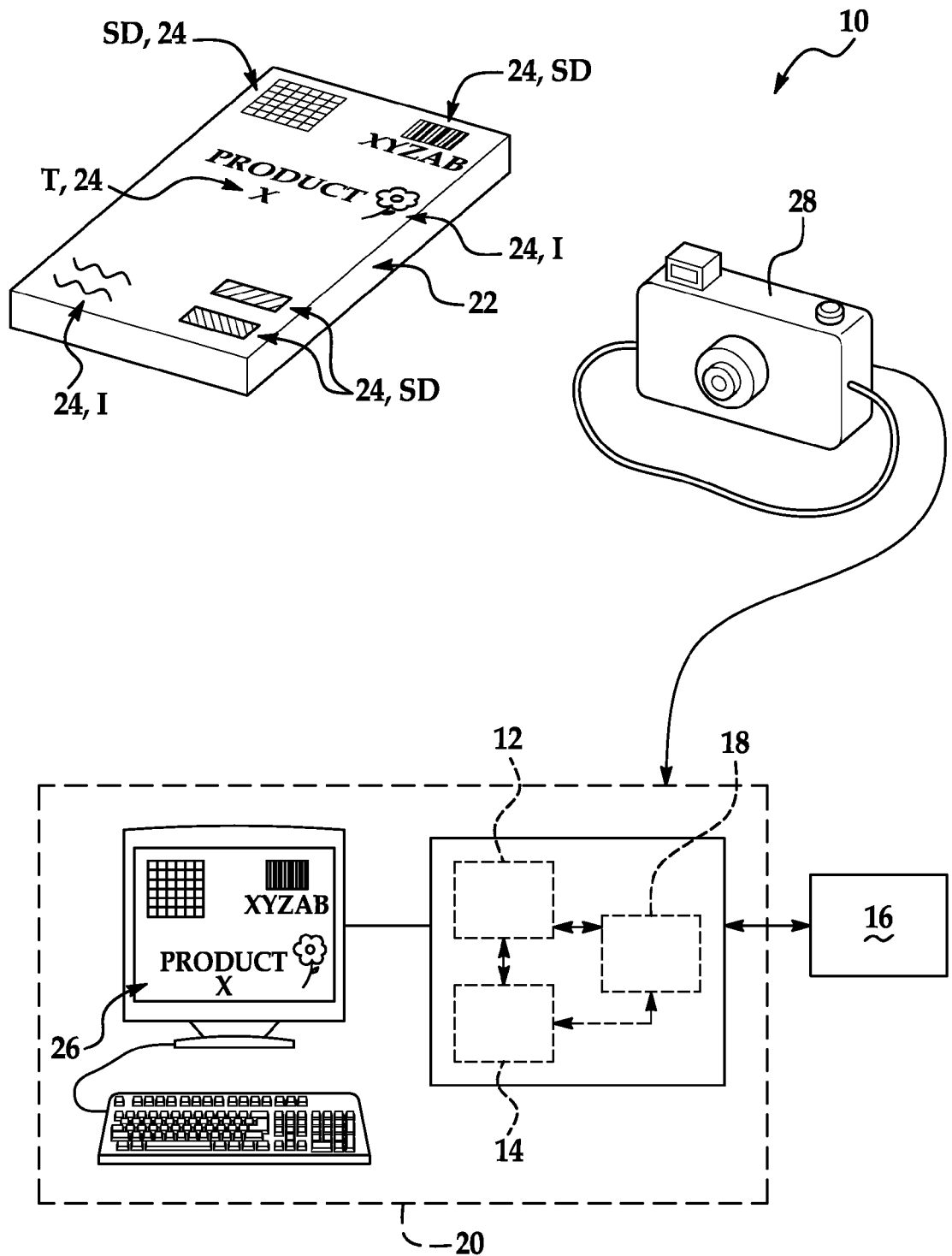
FIG. 1 is a schematic diagram of an embodiment of a system for enhancing security printing.

Referring now to FIG. 1, a schematic diagram of an embodiment of the system 10 for enhancing security printing is depicted. Very generally, the system 10 includes a segmentation system 12, a secure database 14, a secure registry 16, and an analysis system 18. These components of the system 10 are part of a computer or enterprise computing system 20, which includes programs or software configured to segment an image, store and retrieve previously saved templates and/or zoning output specifications, store and retrieve previously stored region of interest information and strategies, and identify one or more regions of interest of the image.

As used herein, the term "enterprise computing system" means a network of interconnected computers, including virtualized and/or redundant processors, banks of processors and/or servers, etc. It is to be understood that the components 12, 14, 16, 18 of the system 10 may be implemented in a consolidated location, or portion(s) of the system may be implemented at different locations.

The hardware of such system components 12, 14, 16, 18 includes an electronic processing device, such as, for example, a controller, a micro controller, a microprocessor, a host processor, an application specific integrated circuit (ASIC), and/or a reprogrammable hardware logic device such as a field programmable gate array (FPGA). It is to be understood that the electronic processing device may be a processor working in conjunction with a central processing unit (CPU) performing the function of a general-purpose processor.

Computer program(s) and/or software (e.g., computer readable code) may be loaded onto the computer or enterprise computing system 20, and stored in a memory thereof. Such programs and/or software are executable via the processing device. The system components 12, 14, 16, 18 may also include one or more algorithms that are executable via the electronic processing device. Such algorithms are incorporated into the computer or enterprise computing system 20 and/or into the software. Generally, images are segmented and analyzed using one or more of the algorithms.

The system 10 also includes an object 22 upon which one or more indicia 24 are printed. It is to be understood that the term "object" as used herein is to be interpreted broadly and may include, but is not limited to, any type of object, product, document or package. Likewise, the term "package" is to be interpreted broadly herein to include any unit for containing a product, displaying a product, or otherwise identifying a branded good. Non-limitative examples of such packages include boxes, bags, containers, clamshells, bands, tape, wraps, ties, bottles, vials, dispensers, inserts, other documents, or the like, or combinations thereof.

The indicia 24 printed on the object 22 may include, but are not limited to graphical indicia, alphanumeric indicia, or combinations thereof. In one non-limiting example, the indicia 24 are text T or images I which include brand information, product information, manufacturer or distributor information, and/or any other desirable textual and/or graphical information. In another non-limiting example, the indicia 24 are security deterrents SD (some of which may be steganographic, i.e., capable of having information hidden therein) selected from color lines, fingerprints, color text, copy detection patterns (CDP), color tiles, letter sequences, number sequences, graphic sequences, target patterns, bar codes, and the like, and combinations thereof. It is contemplated as being within the purview of the present disclosure that the steganographic security deterrents SD may be variable, i.e., the steganographic security deterrents SD on one object 22 are different than one or more steganographic security deterrents SD on any other object 22. Furthermore, it is to be understood that any combination of the types of indicia 24 may be incorporated on the object 22.

As non-limiting examples, the indicia 24 may be formed of inkjet ink, laserjet ink, spectrally opaque ink, spectrally transparent ink, ultraviolet ink, infrared ink, thermochromatic ink, electrochromatic ink, electroluminescent ink, conductive ink, magnetic ink, color-shifting ink, quantum dot ink, phosphorescent ink, a guilloche, a planchette, holographs, security threads, watermarks, other security deterrents, anti-tamper deterrents, and combinations thereof.

It is to be understood that any of the steganographic security deterrents SD may contain information. In some embodiments, the information hidden within the security deterrents SD is authenticating information, security information, or both. The information hidden within the security deterrent SD may be for tracking, branding, or the like, or various combinations thereof. In other embodiments, the information hidden within security deterrents SD is decoy information meant to mislead an unintended recipient of that information. In still other embodiments, no information is hidden within the security deterrent SD. It is also to be understood that a single security deterrents SD may have hidden therein any combination of the above, as desired; for example, a security deterrent SD may have hidden therein authenticating, security and tracking information, as well as some decoy information.

Further, it is to be understood that the information may be, for example, a code; a sequence of bits, bytes, characters, colors, graphics, numbers, etc.; a watermark; symbols; interpretable information; a fingerprint(s); other biometric data (e.g., plain, encoded, encrypted, scrambled, chained to other information); a "payload;" modulation transfer functions (e.g., used in conjunction with a target pattern); or the like; or combinations thereof. A payload is usually a short (8-32 bit) message stored in the security deterrent. Examples of deterrents, information contained within such deterrents, or combinations thereof are described further in the following patent applications, each of which is incorporated herein by reference in its entirety: U.S. patent application Ser. No. 11/465,763 filed Aug. 18, 2006 (U.S. Patent Application Publication No. 2008/0043273, published Feb. 21, 2008); Ser. No. 11/414,113 filed Apr. 28, 2006 (U.S. Patent Application Publication No. 2007/0256136, published Nov. 1, 2007); Ser. No. 11/076,534 filed Mar. 8, 2005 (U.S. Patent Application Publication No. 2006/0202470, published Sep. 14, 2006); and Ser. No. 11/192,878 filed Jul. 29, 2005 (U.S. Patent Application Publication No. 2007/0024915, published Feb. 1, 2007).

As shown in FIG. 1, a digital image 26 of one or more of the indicia 24 is captured using an electronic device 28. In this non-limiting example, the electronic device 28 is a digital camera. It is to be understood that the digital camera may be embodied in, for example, a cellular phone, a personal digital assistant, or the like. Another suitable electronic device 28 is a scanner, an inspection camera, a tabletop imager, or the like.

The digital image 26 of all or a portion of the object 22 is then transmitted from the electronic device 28 to the computer or enterprise computing system 20. Very generally, the segmentation system 12 identifies different zones or regions from the digital image 26 and classifies the zones or regions; and the analysis system 18 utilizes one or both of the secure database 14 and the secure registry 16 in order to identify regions of interest of the digital image 26. It is to be understood that the system 10 and the various components thereof will be described further hereinbelow.

Figure 2:
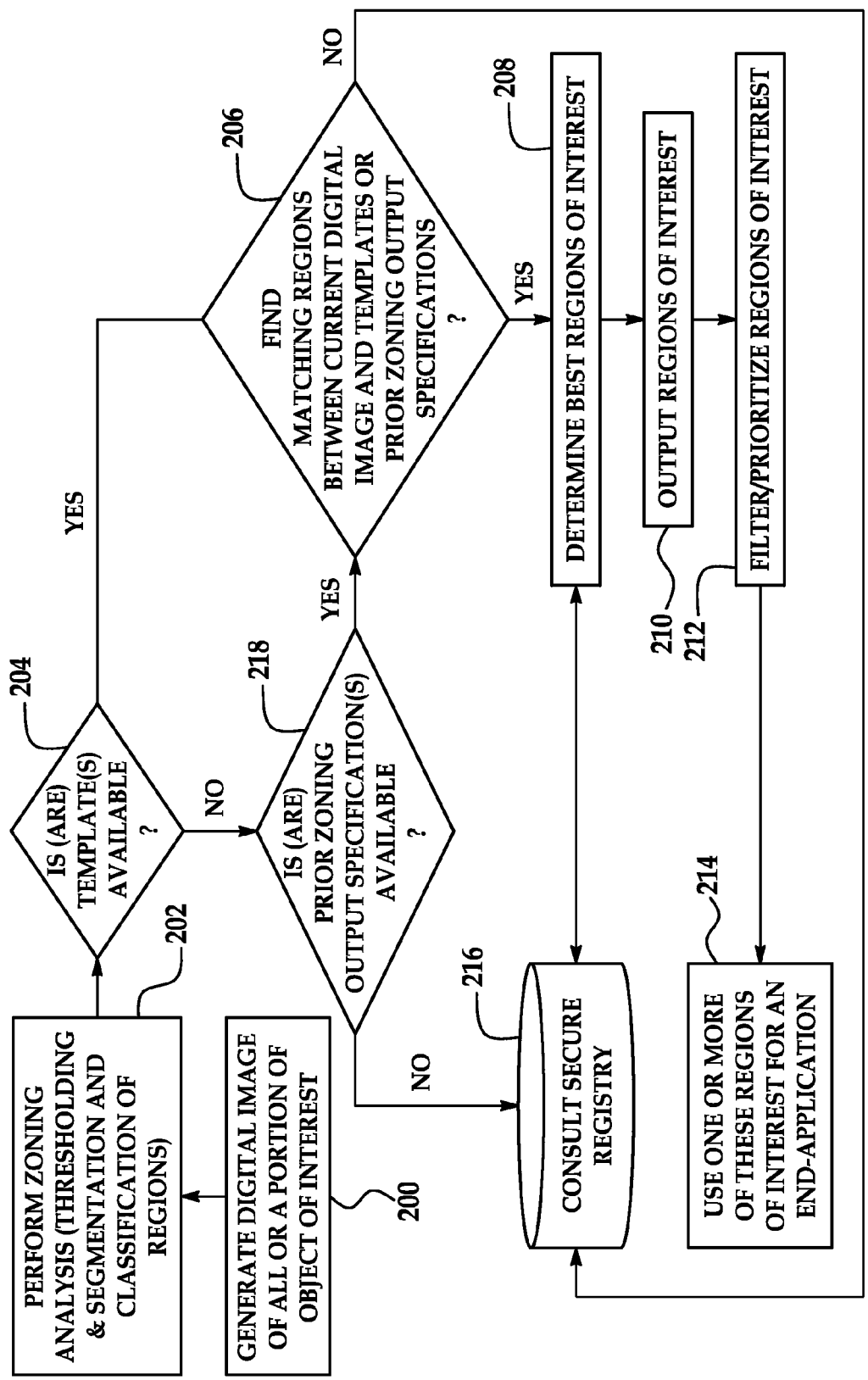
FIG. 2 is a flow diagram depicting various embodiments of a method for enhancing security printing.

Referring now to FIG. 2, various embodiments of the method for enhancing security printing using the system 10 of FIG. 1 are depicted. Each embodiment of the method begins with generating the digital image 26 of the object 22 of interest (as shown at reference numeral 200, and as previously described with reference to FIG. 1). It is to be understood that the digital image 26 includes at least those indicia 24 printed on the object 22 that are to be analyzed. In some instances, the digital image 26 may include all of the indicia 24 printed on the object 22, and in other instance, the digital image 26 may include some of the indicia 24 printed on the object 22 (see, e.g., FIG. 1). Whether the digital image 26 is generated via an electronic device 28 that is an internal component of or an external component of the computer or enterprise computing system 20, the image 26 is transmitted to the segmentation system 12. As one non-limiting example, the image 26 is captured via an inspection camera that is external to the system 20, and is transmitted to the segmentation system 12 via electronic email, SMS messaging, or any other transportation mechanism (e.g., MMS, EMS, WAP, etc.). As another non-limiting example, the image 26 is captured via a scanner that is internal to the system 20, and is transmitted directly from the scanner to the segmentation system 12.

As shown at reference numeral 202, the segmentation system 12 then performs zoning analysis on the digital image 26. Zoning analysis generally includes thresholding (i.e., binarization of an image by assigning one or more population of pixels to "black" and the residual population(s) to "white"), segmentation, and classifications of various zones/regions in the image 26. In one embodiment, the segmentation system 12 facilitates the identification of such zones by preprocessing image 26. In particular, segmentation system 12 may create a raster from the image 26, and then apply a threshold to the raster to clear it of any undesirable background pixels. The segmentation system 12 then run-length smears the image 26 enough to substantially prevent formation of an abundance of small regions, and to merge regions separated by relatively small gaps. In an embodiment, run-length smearing is accomplished at $2/5$ (or $8/300$) of an inch. The image 26 is then thinned or eroded (i.e., shrunk along its boundaries) and fattened or dilated (i.e., expanded along its boundaries) to remove single-pixel width noise without affecting large regions that are not so removed. Run-length smearing is then performed with a calculated smear value. Any additional noise is removed along the edge of the image 26.

The different zones or regions of the image 26 are then identified/classified, and a list of regions is generated for the image 26. It is to be understood that automatic image analysis includes classification of the connected component regions segmented from the original image. Region type classifications may be registered independently of the end applications; as such, a segmentation system engine can search and find generic classes in which the regions may be categorized. In one embodiment, the region type classifications are based on a particular class of information, such as, for example, text, image, table, drawing, or security deterrent (e.g., a 2D bar code, color tile, watermark, copy detection pattern, guilloche, etc.). Referring back to the examples shown in FIG. 1, the "PRODUCT X" indicia T, 24 of the image 26 would be classified as text, the flower indicia I, 24 of the image 26 would be classified as an image, and the color tile and barcode SD, 24 of the image 26 would each be classified as security deterrents. By dividing up the image 26, the segmentation system 12 essentially extracts and classifies the indicia 24 from the digital image 26 for further analysis.

Classification may be accomplished by a variety of different known methods. Non-limiting examples of suitable classification techniques include voting techniques, metric-confidence techniques, or techniques based solely on the statistics of each heuristic metric of the image (an example of which is described in Simske, "Low-Resolution Photo/Drawing Classification: Metrics, Method and Archiving Optimization" Image Processing, 2005. ICIP 2005. Volume 2, 11-14 Sep. 2005 Page(s):II-534-7, the contents of which is incorporated herein by reference). Still other commonly deployed classifiers include Support Vector Machine (SVM), Independent Component Analysis (ICA), Adaboost, Artificial Neural Networks (ANNs), or the like.

After the zoning analysis is complete, a user of the computer or enterprise computing system 20 accesses the secure database 14 in order to determine whether a previously stored template is available for comparison with one or more of the regions in the list, as shown at reference numeral 204. A template includes a description of the location of one or more of the regions and the region type classification of one or more of the regions. Such templates are generated from other images 26 that have previously undergone zoning analysis using the segmentation system 12. Again referring back to the image 26 shown in FIG. 1, if this image 26 had previously been exposed to segmentation, a template indicating the x, y coordinates of each of the indicia 24, and the class type associated with each of the indicia 24 may have been generated. Such templates are stored in the secure database 14. A query of existing templates may be run on the database 14 using the listed regions of the current image 26 as the search parameters.

Referring back to FIG. 2, if one or more templates is/are available, the analysis system 18 will compare each of the regions that are included in the list with each available template to determine if one or more matches are found, as shown at reference numeral 206. Matching the template to the regions may, for example, be accomplished via linear spatial filtering, where the template is used as a filter mask. Another non-limiting example of a technique used for matching is image (auto)correlation. When a match between the listed regions and an existing template is found, the existing template is reviewed for previously identified and/or optimized regions of interest. Since the template is based upon one or more previously analyzed images, it may identify regions that are particularly suitable for a specific end application and/or it may identify how to optimize one or more regions for a specific end application. As such, in this embodiment of the method, defining/determining the region(s) of interest in the image 26 (as shown at reference numeral 208) is accomplished using one or more regions of interest identified in the previously stored template. As one example, a stored template which matches the digital image 26 may indicate that the color tile security deterrent SD, 24 is consistently rated as the best indicia 24 to enable an image-based forensic service to differentiate the image 26 from a counterfeit. As another example, the stored template which matches the digital image 26 may indicate that purposefully misspelling the indicia "PRODUCT X" T, 24 adds another region of variability to the deployed object 22, at least in part because counterfeiters often correct the spelling.

The identified regions of interest are then output to a user of the system 20, as shown at reference numeral 210. Such output may be in an electronic and/or printed format. The analysis system 18 then filters or prioritizes the identified regions of interest based upon a particular end-use, as shown at reference numeral 212. The intended end-use may be input via a user, or the analysis system 18 may be programmed to filter/prioritize for multiple end applications, such as, for example, quality assurance, inspection, authentication, part-tracking (e.g., during manufacturing or through a supply chain), and forensics.

The user may then select one or more of the identified and prioritized regions of interest for the desirable end application, as shown at reference numeral 214. In some instances, for example, when the end-use is quality assurance, inspection, or forensics, the regions of interest may be optimized or altered and then deployed. In other instances, for example, when the end-use is authentication, the regions of interest may be authenticated automatically using an authentication algorithm or manually via the user, thereby enabling the so-identified region(s) of interest to be positively or negatively identified.

Referring back to reference numeral 204, if a template is available but the regions in the list generated via the segmentation system 12 do not match the regions in any of the available templates, the method continues with the analysis system 18 consulting the secure registry 16 (as shown at reference numeral 216) to assist in determining the regions of interest. The secure registry 16 has stored therein one or more strategies for identifying the regions of interest. Such strategies may be based on image metrics and/or historical significance. Such strategies may also be associated with a particular end-use (non-limiting examples of which are discussed further hereinbelow). The strategies may be developed and saved after one image has been deployed and analyzed, inspected, authenticated, or the like, and may be changed and/or refined over time. It is to be understood that any type of machine learning may be employed here.

A strategy involving image metrics may include identifying areas/regions within the image 26 having the highest variability in histograms generated for the image 26. Such variability may be defined in terms of image histogram entropy, variance, intensity, saturation, hue, or some other histogram characteristic, such as chroma, brightness, or the like. Strategies for identifying regions of interest involving image metrics may also include identifying mean edge sharpness, edge directionality randomness, or the like. An image 26 having one or more particular metrics may be associated with previously deployed images that have been identified in the secure registry 16 as being particularly suitable for one or more end applications. For example, strategies which involve looking for predetermined metrics include looking for metrics in previously deployed images which have previously proven useful for one or more desirable applications.

It is to be understood that to identify a region of interest that contains variable data, one needs to compare the information in two or more images of a variable data printing job (e.g., barcodes on two different labels). The following are two exemplary methods of performing such a comparison. In one embodiment, the histograms of the two or more images are directly compared. This is generally accurate so long as the capture devices/settings are consistent across the images. In another embodiment, a relative comparison is made (e.g., subtracting one image from the other and then computing the single "difference histogram" in any of the region spaces, i.e., colors, hue, intensity, saturation, edge spaces, etc.).

Another strategy for defining regions of interest may involve looking at areas of historical significance for a particular end-application. Such information is compiled in the secure registry 16 over time, and such information may be searched by querying the registry 16. It is to be understood that any reasonable attribute of analyzed images may be stored. For a non-limiting example, difference histograms (mentioned hereinabove) may be stored, with the secure registry reference for the histograms being the idealized form of the region. As a non-limiting example, if the end-application is forensic evaluation, then the strategy may involve looking for the largest single image that is consistently part of a zoning set. Such an image may be indicated in the registry 16 as being a good candidate for the selected region of interest for forensic applications. As another non-limiting example, if the end-application is text quality/content inspection, then the strategy may involve looking for the largest text region in the image 26. Such a region may be indicated in the registry 16 as being a good candidate for the selected region of interest for quality/content inspection applications. As still another non-limiting example, if the end-application is determining steganographic content areas, then the strategy may involve looking for small regions, which may be noted in the registry 16 as being good candidates for the selected region of interest for such applications.

Other selection strategies which correspond with a particular end-use may be utilized when selecting the regions of interest of the image 26. Such strategies may be stored in the secure registry 16 and accessed by the analysis system 18. Some non-limiting examples of such strategies are outlined in the following three paragraphs. Furthermore, while examples of suitable strategies are disclosed herein, it is to be understood that other strategies may be developed, which depend, at least in part, on the information supplied to the secure registry 16 regarding actual deployment of indicia 24 on objects 22.

Region variability found in static regions (e.g., those indicia 24 used for branding, product information, etc.) is a sign of poor quality. When the system 10 and method(s) disclosed herein are used for quality assurance, the identification of the regions of interest may be used to draw attention to areas of lower quality so that the pre-press process can be altered to improve print quality thereafter. For this particular end application, examples of salient means or strategies to select regions of interest include looking for predetermined measures of bimodality in the histograms of text or line drawing regions of the image 26 and/or for poor overall gamut (i.e., low-gamut saturafeion mapping around the color space) for photo regions of the image 26. Examples of the predetermined measures of bimodality which may be looked for include i) the intensity histogram has less than 25% of the pixels in the white and black peaks, respectively, or ii) the histogram has less than or more than two prominent peaks (which indicates a low quality bar code). An example of low-gamut saturation mapping includes one or more colors in the color space having no saturation, while others are partially saturated, and at least one is fully saturated. When the analysis system 18 is informed that quality assurance is one of the desirable end applications for the image 26, it may automatically request that the secure registry 16 provide means/strategies for identifying the regions of interest for such an application. For example, the analysis system 18 can ping the back-end service/registry 16 for the characteristics of the salient regions of interest, and in so doing limit its computations to those particular image measurements.

When the desired end-use is inspection, the strategy for region of interest selection may be guided by a list of deterrents SD, 24 that are or may be deployed in the image 26. In this case, the regions in the list (or regions matching prior zoning output specifications (discussed further hereinbelow)) are assessed for variability, and then these regions are classified according to deterrents SD, 24 associated with the assessed variability. As a non-limiting example, a barcode may be distinguished from a color tile deterrent based on color content and bimodality. The former (i.e., the barcode) will be bimodal with no hue, low saturation, and low color gamut, while the latter (i.e., the color tile) will be octamodal (black, white, RGBCMY) with high hue differences, high saturation, and high color gamut. Other factors (size, shape, structure, etc.) can be used to refine the definition of any plurality of deterrents SD, 24. The regions of interest may then be selected based on the desired variability and/or the type of inspection to be performed.

Inspection as an end use also accommodates using an image evaluation as a strategy for identifying regions of interest. Using this strategy, regions identified as being highly variable can be reviewed as steganographic deterrents SD, even though such regions are not typically deterrents SD. For example, a text indicia T, 24 may be purposely misspelled if such words would normally be, or have already been corrected by counterfeiters, or the colors of a graphic indicia I, 24 may be purposely altered if such colors would normally be, or have already been corrected by counterfeiters.

When the end-use application is forensics, the methods disclosed herein are generally used at the front end for an image-based forensic service (which is used to distinguish authentic from counterfeit samples). In such instances, the strategy involves initially identifying potential regions of interest which are consistently part of the zoning output or template. Then, this output is used to determine which regions of interest should thereafter be of highest priority. Generally, the regions of interest that best enable the image-based forensic service to differentiate counterfeit from authentic samples are the regions selected for subsequent deployment on an object 22.

It is to be understood that any of the above strategies for region of interest identification may be used for overall implementation of the methods disclosed herein. For example, if it is desirable to maximally distinguish one image set from another, then all regions consistently segmented from the captured images should be analyzed to see which, if any, best aid in the identification of altered images (e.g., counterfeited images).

The analysis system 18 is programmed to review any information available at and retrieved by the secure registry 16, and to determine the best strategy for identifying the regions of interest in the image 26, depending, at least in part, on the strategy and information provided by the registry 16 and/or any information input via a user regarding the desirable end-use. The analysis system 18 then determines the best regions of interest (reference numeral 208), and outputs, to a user of the system 20, the identified regions of interest (reference numeral 210). The analysis system 18 then filters or prioritizes the identified regions of interest based upon a particular end-use, as shown at reference numeral 212, and the user may then select one or more of the identified and prioritized regions of interest for the desirable end application, as shown at reference numeral 214.

Again referring back to reference numeral 204, if a template is not available, the method continues with the analysis system 18 determining whether one or more prior zoning output specifications is available in the secure database 14, as shown at reference numeral 218. Prior zoning output specifications are results (i.e., list of regions, region types/classifications, and/or region characteristics) from other images that have undergone zoning analysis that are stored in the secure database 14.

When such prior zoning output specifications are available in the secure database 14, the analysis system 18 performs a comparison to determine whether any of the regions in the list (from the image 26) match regions in the prior zoning output specifications (stored in the database 14), as shown at reference numeral 206. When matches are identified, regions from the list are aligned with matching regions from the prior zoning output specifications. Aligning such matching regions may provide an indication to the user as to which of the regions in the image 26 have most often been used in prior images. Image alignment may also enable one to use multiple regions simultaneously for better overall confidence in completion of the imaging task. Still further, image alignment may allow for variations between overall image templates to be determined, for example, where the layouts differ but the copy holes (different printed areas) are similar or the same.

In some instances, the match of one or more of the listed regions with the regions in the prior zoning output specifications may be enough for the analysis system 18 to determine the best regions of interest (reference numeral 208). This may occur, for example, where only one region with variability is identified. In such instances, the analysis system 18 will continue with the method steps 210 and 212, and a user may utilize such identified and prioritized regions as set forth in step 214.

In other instances, however, the match of one or more of the listed regions with the prior zoning output specifications may not be enough for the analysis system 18 to determine the best regions of interest. In such instances, the analysis system 18 is programmed to operatively connect to the secure registry 16 and query the registry 16 for one or more suitable strategies for determining the regions of interest. The registry 16 will inform the analysis system 18 of any strategies on file that correspond with the request, and the analysis system 18 will use one or more of the strategies to identify the regions of interest in the image 26.

After the analysis system 18 determines the regions of interest (reference numeral 208), it outputs, to a user of the system 20, the identified regions of interest (reference numeral 210). The analysis system 18 then filters or prioritizes the identified regions of interest, as shown at reference numeral 212. In this and other embodiments disclosed herein, prioritizing may involve ranking the identified regions of interest with sufficient scores (e.g., 1-10, where 1 is 0% consistency and 10 is 100% consistency) based on the consistency of one or more of the regions across a variety of previous image sets. This type of ranking is a nonparametric (i.e., discrete) ranking. It is to be understood, however, that any parametric (i.e., continuous) ranking can be used, which is based on using the relative confidence in the scores. Prioritizing for security printing and image quality assurance applications can also be ordered/ranked/scaled based on the value of the information (e.g., more important (e.g., for authentication/forensics) regions/metrics will be scaled higher for security applications, and more important (e.g., for quality) regions/metrics will be prioritized for quality assurance).

It is to be understood that the scoring/prioritizing may be changed over time as the relative importance of different regions of interest for a particular end task changes. As one non-limiting example, if a particular region of interest, which previously was not consistently used for security applications, begins to be consistently used for security applications, the analysis system 18 may be reprogrammed to take into consideration the fact that the importance of the particular region of interest for security applications has increased. As another non-limiting example, the importance of one or more deterrents may be decreased when such deterrents are more routinely attacked by counterfeiters. Such a dynamic ranking/scoring system may be particularly useful for providing an innate moving target that responds to the relative success of counterfeiters, the most likely printing errors, etc.

The user may then select one or more of the identified and prioritized regions of interest for the desirable end application, as shown at reference numeral 214.

As shown in FIG. 2, if a prior zoning output specification is not available, the analysis system 18 will consult the secure registry 18, as shown at reference numeral 216. The analysis system 18 will query the registry 16 for one or more strategies for defining the regions of interest in the image 26, as described hereinabove. Once the interest regions are identified (reference numeral 208), they are output to the user (reference numeral 210), and filtered/prioritized (reference numeral 212), as previously described. The user may then use one or more of the identified regions of interest as desired (reference numeral 214).

Embodiments of the method and system 10 disclosed herein may advantageously be used for a variety of applications. As mentioned hereinabove, the identification of one or more regions of interest may assist in generating higher quality images for subsequent deployment, enhance anti-counterfeiting efforts, identify indicia 24 suitable for being used as security deterrents SD, and for a variety of other purposes.

Clause 1: A system for enhancing security printing, comprising:

a segmentation system for performing zoning analysis on a scanned image, thereby identifying a list of regions in the image;

a secure database in operative communication with the segmentation system, the secure database storing at least one of i) a template, or ii) prior zoning output specification;

a secure registry in selective operative communication with the segmentation system, the secure registry storing region of interest information and information pertaining to strategies for identifying a region of interest; and an analysis system in operative communication with the segmentation system and the secure database, and in selective operative communication with the secure registry, the analysis system configured to identify the region of interest utilizing at least one of the secure database or the secure registry.

Clause 2: The system as defined in clause 1 wherein the analysis system is further configured for:

determining whether at least one region from the list of regions matches with a region in the stored template; and when one or more matches is found, then:

defining at least one region of interest from the one or more matches using one or more regions of interest identified in the stored template; or when one or more matches is not found, then:

operatively connecting with the secure registry to identify at least one region of interest from the list of regions using the stored region of interest information and information pertaining to strategies.

Clause 3: The system as defined in any of the preceding clauses wherein the analysis system is further configured for:

determining whether at least one region from the list of regions matches with a region in the prior zoning output specification;

when one or more matches is found, then aligning the one or more matches; and operatively connecting with the secure registry to identify at least one region of interest from the one or more matches using the stored region of interest information and information pertaining to strategies.

Clause 4: The system as defined in any of the preceding clauses wherein the analysis system is further configured for:

determining whether at least one region from the list of regions matches with a region in the stored prior zoning output specification; and when one or more matches is not found, then operatively connecting with the secure registry to identify at least one region of interest from the one or more matches using the stored region of interest information and information pertaining to strategies.

Clause 5: The system as defined in any of the preceding clauses wherein the analysis system is further configured to prioritize the identified at least one region of interest for a subsequent application.

Clause 6: A method for enhancing security printing, comprising:

performing zoning analysis on a scanned image, thereby identifying a list of regions in the image;

determining whether at least one of i) a previously stored template is available, or ii) prior zoning output specification is available;

attempting to match at least one region from the list of regions with i) a region in the previously stored template, or ii) a region in the prior zoning output specification;

when one or more matching regions are found, then:

defining at least one region of interest from the one or more matching regions using i) one or more regions of interest identified in the previously stored template, or ii) a secure registry and a predetermined strategy; and prioritizing the defined at least one region of interest for a subsequent application; or when one or more matching regions are not found, then:

defining at least one region of interest from the list of regions using a secure registry and a predetermined strategy; and prioritizing the defined at least one region of interest for a subsequent application.

Clause 7: The method as defined in clause 6 wherein the previously stored template is available, wherein the at least one region of interest is defined using the one or more regions of interest identified in the previously stored template, wherein the one or more regions of interest identified in the previously stored template are associated with a predetermined subsequent application, and wherein the subsequent application for which the defined at least one region of interest is prioritized is the predetermined subsequent application.

Clause 8: The method as defined in any of clauses 6 or 7 wherein the previously stored template is available, wherein the at least one region of interest is defined using the secure registry and the predetermined strategy, and wherein the predetermined strategy is selected from identifying based on predetermined metrics, identifying based on historical signification for an end-application, or combinations thereof.

Clause 9: The method as defined in any of clauses 6 through 8 wherein the previously stored template is not available and the prior zoning output specification is available, wherein the at least one region of interest is defined using the secure registry and the predetermined strategy, and wherein the predetermined strategy is selected from identifying based on predetermined metrics, identifying based on historical signification for an end-application, or combinations thereof.

Clause 10: The method as defined in any of clauses 6 through 9 wherein the subsequent application is selected from quality assurance, inspection, authentication, part-tracking, and forensics.

Clause 11: The method as defined in any of clauses 6 through 10 wherein the subsequent application is quality assurance, and wherein defining the at least one region of interest from the one or more matching regions or from the list of regions further comprises at least one of:

identifying at least one text or line drawing region with predetermined measures of bimodality in a corresponding histogram; or identifying photo regions having low-gamut saturation mapping around a color space.

Clause 12: The method as defined in any of clauses 6 through 10 wherein the subsequent application is inspection, and wherein defining the at least one region of interest from the one or more matching regions or from the list of regions further comprises:

assessing the one or more matching regions or the regions in the list for variability; and classifying the one or more matching regions or the regions in the list according to a deterrent associated with the assessed variability.

Clause 13: The method as defined in any of clauses 6 through 12, further comprising using the defined at least one region of interest for the subsequent application for which it is prioritized.

Clause 14: The method as defined in any of clauses 6 through 13 wherein the previously stored template or the prior zoning output specification is based upon region of interest information obtained from other previously scanned images.

Clause 15: The method as defined in any of clauses 6 through 14, further comprising altering one or more parameters for prioritizing based on historical data or a trend indicative of a relative importance of previously deployed regions of interest for one or more end applications.

While several embodiments have been described in detail, it will be apparent to those skilled in the art that the disclosed embodiments may be modified. Therefore, the foregoing description is to be considered exemplary rather than limiting.

What is claimed is:

1. A system for enhancing security printing, comprising:

a segmentation system for performing zoning analysis on a scanned image, thereby identifying a list of regions in the image;

a secure database in operative communication with the segmentation system, the secure database storing at least one of i) a template, or ii) prior zoning output specification;

a secure registry in selective operative communication with the segmentation system, the secure registry storing region of interest information and information pertaining to strategies for identifying a region of interest; and an analysis system in operative communication with the segmentation system and the secure database, and in selective operative communication with the secure registry, the analysis system including computer readable instructions, embodied on tangible, non-transitory computer readable medium, to:

determine whether at least one of i) the template, or ii) the prior zoning output specification is available;

attempt to match at least one region from the list of regions with i) a region in the template, or ii) a region in the prior zoning output specification; and a) when one or more matching regions are found, then to:

define at least one region of interest from the one or more matching regions using i) one or more regions of interest identified in the template, or ii) a secure registry and a predetermined strategy; and prioritize the defined at least one region of interest for a subsequent application; or b) when one or more matching regions are not found, then to:

define at least one region of interest from the list of regions using a secure registry and a predetermined strategy; and prioritize the defined at least one region of interest for a subsequent application.

2. The system as defined in claim 1 wherein the analysis system is further configured for:

determining whether at least one region from the list of regions matches with a region in the prior zoning output specification;

when one or more matches is found, then aligning the one or more matches; and operatively connecting with the secure registry to identify at least one region of interest from the one or more matches using the stored region of interest information and information pertaining to strategies.

3. The system as defined in claim 1 wherein the analysis system is further configured for:
   determining whether at least one region from the list of regions matches with a region in the stored prior zoning output specification; and
   when one or more matches is not found, then operatively connecting with the secure registry to identify at least one region of interest from the one or more matches using the stored region of interest information and information pertaining to strategies.

4. A method for enhancing security printing, comprising:
   performing zoning analysis on a scanned image, thereby identifying a list of regions in the image;
   determining whether at least one of i) a previously stored template is available, or ii) prior zoning output specification is available;
   attempting to match at least one region from the list of regions with i) a region in the previously stored template, or ii) a region in the prior zoning output specification;
   when one or more matching regions are found, then:
      defining at least one region of interest from the one or more matching regions using i) one or more regions of interest identified in the previously stored template, or ii) a secure registry and a predetermined strategy; and
      prioritizing the defined at least one region of interest for a subsequent application; or
   when one or more matching regions are not found, then:
      defining at least one region of interest from the list of regions using a secure registry and a predetermined strategy; and
      prioritizing the defined at least one region of interest for a subsequent application.

5. The method as defined in claim 4 wherein the previously stored template is available, wherein the at least one region of interest is defined using the one or more regions of interest identified in the previously stored template, wherein the one or more regions of interest identified in the previously stored template are associated with a predetermined subsequent application, and wherein the subsequent application for which the defined at least one region of interest is prioritized is the predetermined subsequent application.

6. The method as defined in claim 4 wherein the previously stored template is available, wherein the at least one region of interest is defined using the secure registry and the predetermined strategy, and wherein the predetermined strategy is selected from identifying based on predetermined metrics, identifying based on historical signification for an end-application, or combinations thereof.

7. The method as defined in claim 4 wherein the previously stored template is not available and the prior zoning output specification is available, wherein the at least one region of interest is defined using the secure registry and the predetermined strategy, and wherein the predetermined strategy is selected from identifying based on predetermined metrics, identifying based on historical signification for an end-application, or combinations thereof.

8. The method as defined in claim 4 wherein the subsequent application is selected from quality assurance, inspection, authentication, part-tracking, and forensics.

9. The method as defined in claim 4 wherein the subsequent application is quality assurance, and wherein defining the at least one region of interest from the one or more matching regions or from the list of regions further comprises at least one of:
   identifying at least one text or line drawing region with predetermined measures of bimodality in a corresponding histogram; or
   identifying photo regions having low-gamut saturation mapping around a color space.

10. The method as defined in claim 4 wherein the subsequent application is inspection, and wherein defining the at least one region of interest from the one or more matching regions or from the list of regions further comprises:
   assessing the one or more matching regions or the regions in the list for variability; and
   classifying the one or more matching regions or the regions in the list according to a deterrent associated with the assessed variability.

11. The method as defined in claim 4, further comprising using the defined at least one region of interest for the subsequent application for which it is prioritized.

12. The method as defined in claim 4 wherein the previously stored template or the prior zoning output specification is based upon region of interest information obtained from other previously scanned images.

13. The method as defined in claim 4, further comprising altering one or more parameters for prioritizing based on historical data or a trend indicative of a relative importance of previously deployed regions of interest for one or more end applications.

14. The system as defined in claim 1 wherein the segmentation system is further to classify the regions in the image, and wherein a region type classification includes a security deterrent.

15. The system as defined in claim 14 wherein the template:
   indicates the region type classification; and
   any of identifies that the region type classification is particularly suitable for a specific end application, or identifies how to optimize the region type classification for a specific end application.

16. The system as defined in claim 1 wherein the strategies are selected from strategies based on predetermined metrics, strategies based on historical significance for an end-application, or combinations thereof.

17. A system for enhancing security printing, comprising:
   a segmentation system for performing zoning analysis on a scanned image, thereby identifying a list of regions in the image, the segmentation system including computer readable instructions, embodied on tangible, non-transitory computer readable medium, to:
      identify at least one zones or regions from the scanned image; and
      classify the at least one of zones or regions as text, an image, a table, a drawing, or a security deterrent;
   a secure database in operative communication with the segmentation system, the secure database storing at least one of i) a template, or ii) prior zoning output specification;
   a secure registry in selective operative communication with the segmentation system, the secure registry storing region of interest information and information pertaining to strategies for identifying a region of interest; and
   an analysis system in operative communication with the segmentation system and the secure database, and in selective operative communication with the secure registry, the analysis system including computer readable instructions, embodied on tangible, non-transitory computer readable medium, to:
      attempt to identify the region of interest by comparing stored template information with a description of a location of the at least one of zones or regions and a classification of the at least one of zones or regions;

when a match in the template is not found, attempt to identify the region by comparing the prior zoning output specification with the at least one of zones or regions; and when any of the match in the template is not found or a match in the prior zoning output specification is not found, attempt to identify the region of interest utilizing the secure registry and a predetermined strategy stored therein.

* * * * *